United States Patent
Arnau et al.

(10) Patent No.: US 9,453,580 B2
(45) Date of Patent: Sep. 27, 2016

(54) VALVES HAVING SEGMENTED SLEEVES AND INTERNAL SEALS

(71) Applicant: NESTEC S.A., Vevey (CH)

(72) Inventors: James Arnau, Falmouth, ME (US); Marc Bilodeau, Poland, ME (US); Robert Leone, Gray, ME (US); Glen Wright, Palmetto, FL (US)

(73) Assignee: Nestec S.A., Vevey (CH)

( * ) Notice: Subject to any disclaimer, the term of this patent is extended or adjusted under 35 U.S.C. 154(b) by 19 days.

(21) Appl. No.: 14/402,514

(22) PCT Filed: May 15, 2013

(86) PCT No.: PCT/EP2013/060086
§ 371 (c)(1),
(2) Date: Nov. 20, 2014

(87) PCT Pub. No.: WO2013/174702
PCT Pub. Date: Nov. 28, 2013

(65) Prior Publication Data
US 2015/0129068 A1    May 14, 2015

Related U.S. Application Data

(60) Provisional application No. 61/650,821, filed on May 23, 2012.

(51) Int. Cl.
*F16K 11/07* (2006.01)

(52) U.S. Cl.
CPC ........ *F16K 11/0716* (2013.01); *F16K 11/0704* (2013.01); *F16K 11/0712* (2013.01); *Y10T 137/8667* (2015.04)

(58) Field of Classification Search
CPC ........... F16K 11/0716; F16K 11/0704; F16K 11/0712
See application file for complete search history.

(56) References Cited

U.S. PATENT DOCUMENTS

| | | | |
|---|---|---|---|
| 2,320,905 A | 6/1943 | Bateholts | |
| 2,645,450 A | 7/1953 | Chessman | |
| 3,680,577 A * | 8/1972 | McGeachy | F15B 13/0402 137/625.6 |
| 3,744,523 A * | 7/1973 | Hill | F15B 13/0402 137/625.68 |
| 3,960,166 A * | 6/1976 | Linser | F16K 11/0716 137/271 |
| 4,050,983 A * | 9/1977 | Kleimola | G21C 9/00 376/283 |
| 4,070,005 A * | 1/1978 | McJones | F16K 11/0712 251/210 |
| 4,220,174 A * | 9/1980 | Spitz | F16K 11/0708 137/271 |
| 4,371,178 A * | 2/1983 | Ott | F16K 27/041 137/625.66 |

(Continued)

FOREIGN PATENT DOCUMENTS

| | | |
|---|---|---|
| EP | 1197692 | 4/2002 |
| FR | 2083944 | 12/1971 |

*Primary Examiner* — Craig Schneider
*Assistant Examiner* — Kevin Barss
(74) *Attorney, Agent, or Firm* — K&L Gates LLP

(57) ABSTRACT

The present disclosure provides air-tight mechanical valves. In a general embodiment, the valves include a shaft and a segmented sleeve. The shaft includes a plurality of shaft ports distributed around a circumference of the shaft. The sleeve is configured to fit concentrically around the shaft and includes a body having at least two body pieces, at least one internal seal, and at least one set of a plurality of sleeve ports distributed around a circumference of the body. The plurality of sleeve ports cooperates with the plurality of shaft ports to facilitate fluid flow. The valves of the present disclosure advantageously reduce losses of pressure and compressed air during use.

13 Claims, 7 Drawing Sheets

(56) References Cited

U.S. PATENT DOCUMENTS

| | | | | |
|---|---|---|---|---|
| 4,491,154 A | * | 1/1985 | Peters | F16K 11/0716 137/625.26 |
| 6,520,478 B1 | * | 2/2003 | Hope | F16K 11/0704 251/297 |
| 6,554,014 B2 | * | 4/2003 | Beyrak | F16K 3/26 137/1 |
| 2007/0119501 A1 | * | 5/2007 | Pinette | F16K 11/0716 137/98 |

* cited by examiner

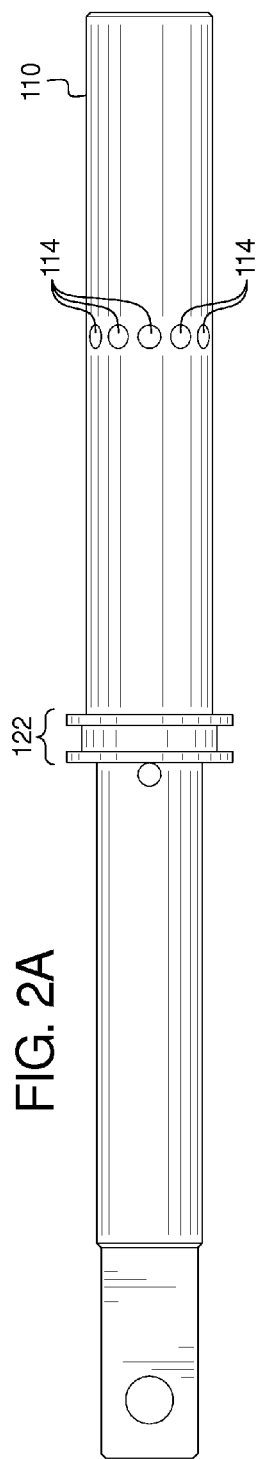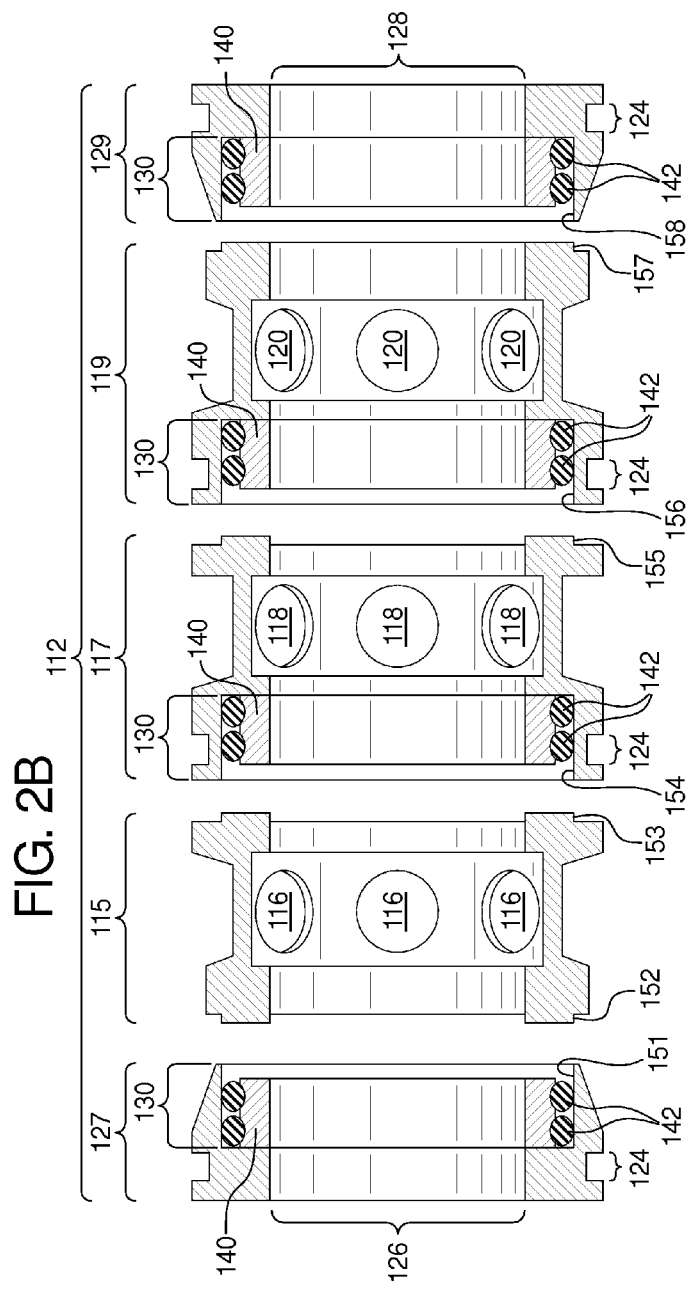
FIG. 2A
FIG. 2B

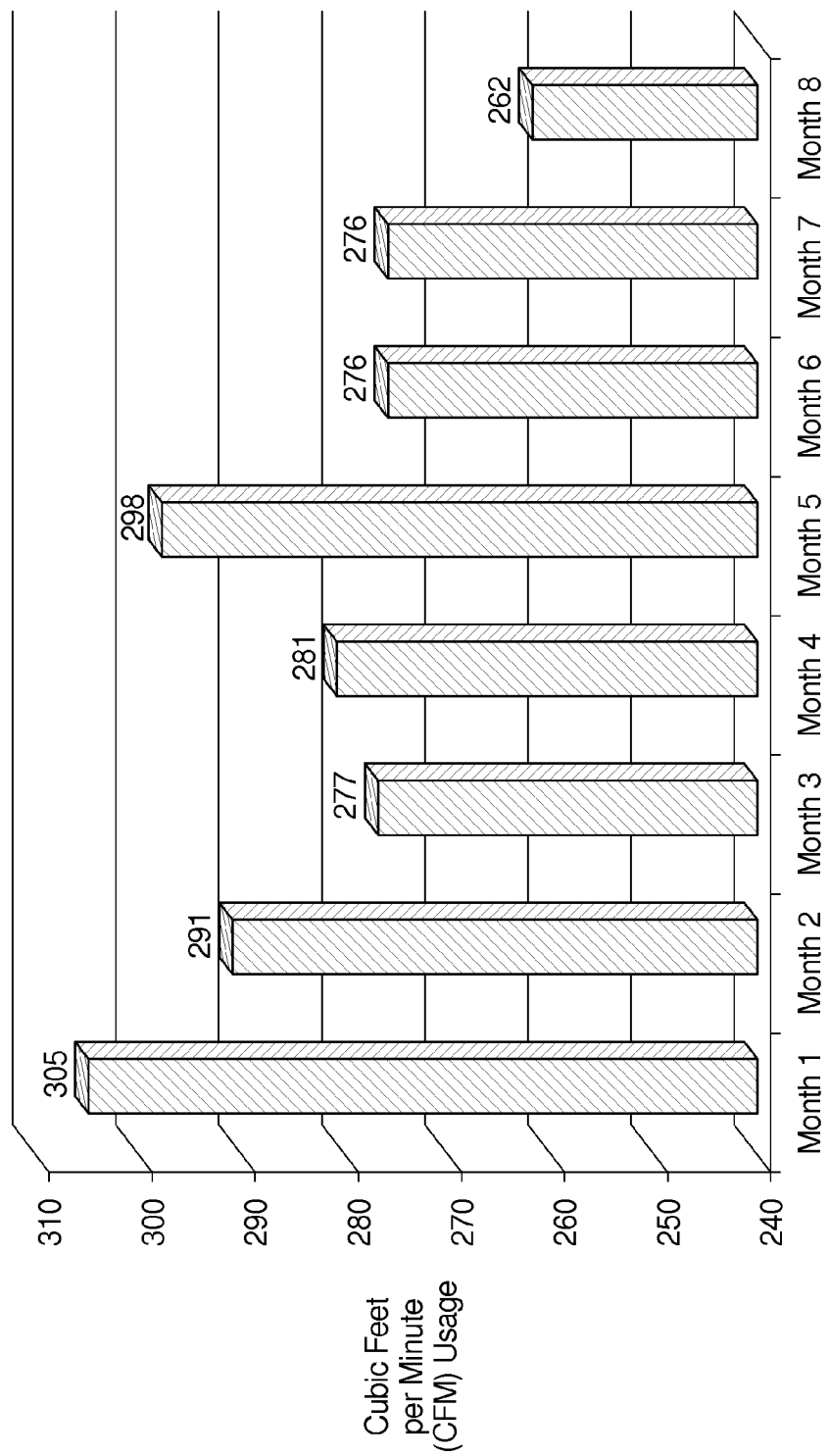

VALVES HAVING SEGMENTED SLEEVES AND INTERNAL SEALS

CROSS REFERENCE TO RELATED APPLICATIONS

The present application is a National Stage of International Application No. PCT/EP2013/060086, filed on May 15, 2013, which claims priority to U.S. Provisional Application Ser. No. 61/650,821, filed on May 23, 2012, the entire contents of which are being incorporated herein by reference.

BACKGROUND

The present disclosure relates generally to valves. More specifically, the present disclosure relates to valves for use in blow molding processes. Several aspects of valves may be discussed in the present disclosure including, but not limited to, providing a more effective sealing system in the valves and eliminating the need to strictly index various ports inside the valve for proper function.

Many of today's glass and plastic bottles are made through a blow molding process. There are three basic types of blow molding: extrusion blow molding, injection blow molding, and stretch blow molding. Blow molding typically requires highly pressurized compressed air. Due to manufacturing and storage costs, high pressure compressed air is a significant expense in a blow molding facility.

Additionally, inefficiencies in the blow molding process can increase the expense of high pressure condensed air. For example, air leakages in the blow molding process can cause a loss of pressure and waste of pressurized air.

SUMMARY

The present disclosure relates generally to valve components, more particularly to mechanical three way valve components. The valves are typically used in blow molding machines to manufacture blow molded products. The valve components are optimized to improve their energy efficiency, prevent costly leaks, and enable repairs.

In a general embodiment, the present disclosure provides valves which include a shaft and a segmented sleeve. The shaft includes a plurality of shaft ports distributed around a circumference of the shaft. The sleeve is configured to fit concentrically around the shaft and includes a body having at least two body pieces, at least one internal seal, and at least one set of a plurality of sleeve ports distributed around a circumference of the body. The plurality of sleeve ports cooperates with the plurality of shaft ports to facilitate fluid flow.

In an embodiment, the plurality of shaft ports includes at least four ports and the plurality of sleeve ports includes at least four ports.

In an embodiment, the sleeve and shaft are substantially cylindrical.

In an embodiment, the internal seal includes at least one depression configured to seat an o-ring.

In another embodiment, the body includes at least five body pieces. In an embodiment, the at least five body pieces include two end pieces, a locking piece, and at least two sealing pieces.

In an embodiment, each of the end pieces and sealing pieces house at least one internal seal.

In an embodiment, each of the locking piece and the sealing pieces has at least one set of a plurality of sleeve ports distributed around a circumference of said piece, and each set of sleeve ports is distributed along a pane that is substantially perpendicular to a central axis of the shaft In an alternative embodiment, the present disclosure provides a valve including a shaft and a sleeve. The shaft has a plurality of shaft ports distributed around a circumference of the shaft and the shaft ports are distributed along a plane that is substantially perpendicular to a central axis of the shaft. The sleeve is configured to fit concentrically around the shaft, and includes a body having at least two pieces. The sleeve also includes at least one internal seal. The sleeve further includes at least one set of a plurality of sleeve ports distributed around a circumference of the body, and each set of sleeve ports is distributed along a plane that is substantially perpendicular to a central axis of the shaft. The plurality of sleeve ports are configured to be larger in size than the plurality of shaft ports such that, when aligned, each sleeve port encompasses at least a portion of at least two shaft ports.

In an embodiment, the body includes at least three body pieces.

In an embodiment, at least two of the at least three body pieces includes an internal seal.

In an embodiment, each of the body pieces has at least two sets of sleeve ports distributed around a circumference of the piece, and each set of sleeve ports is distributed on unique, adjacent planes that are substantially perpendicular to a central axis of the shaft.

In an embodiment, the plurality of sleeve ports of each of the at least two sets of sleeve ports on each of the body pieces are distributed approximately evenly about said piece such that one set of sleeve ports is distributed offset from the other set.

In an embodiment, a size of one of the plurality of sleeve ports is at least 1.5 times a size of one of the plurality of the shaft ports.

In an alternative embodiment, the present disclosure provides a valve including a shaft and a sleeve. The shaft has a plurality of shaft ports distributed around a circumference of the shaft and the shaft ports are distributed along a shaft port plane that is substantially perpendicular to a central axis of the shaft. The sleeve is configured to fit concentrically around the shaft, and includes a body having at least two pieces. The sleeve also includes at least one internal seal. The sleeve further includes at least one set of a plurality of sleeve ports distributed around a circumference of the body, and each set of sleeve ports is distributed along a sleeve port plane that is substantially perpendicular to a central axis of the shaft. A distance between each of the sleeve ports is configured to be greater than a distance between each of the shaft ports such that, when the shaft port plane and sleeve port plane are aligned, each sleeve port encompasses at least a portion of at least two shaft ports.

In an embodiment, the plurality of shaft ports comprises at least eight ports and the plurality of sleeve ports comprises at least four ports.

In an embodiment, the distance between each of the sleeve ports is about twice the distance between each of the shaft ports.

An advantage of the present disclosure is to provide improved valves to provide higher pressure air flow with more consistency.

Another advantage of the present disclosure is to provide improved valves that do not rely on a metal to metal sealing surface.

Another advantage of the present disclosure is to provide improved valves that do not leak high pressure compressed air.

Another advantage of the present disclosure is to provide improved valves that are easily repairable.

Another advantage of the present disclosure is to provide improved valves that do not require strict indexing between sleeves and shafts.

Another advantage of the present disclosure is to provide improved valves that are more energy efficient and environmentally friendly.

Another advantage of the present disclosure is to provide improved valves that enable further light weighting of blow molded products.

Additional features and advantages are described herein, and will be apparent from the following Detailed Description and the figures.

BRIEF DESCRIPTION OF THE FIGURES

FIG. 2A shows a side view of a valve shaft in accordance with an embodiment of the present disclosure.

FIG. 2B shows an exploded cross-section side view of a valve sleeve in accordance with an embodiment of the present disclosure.

FIG. 5 shows a bar chart of cubic feet per minute of compressed air usage per month, as discussed in the present Examples.

DETAILED DESCRIPTION

Figure 1A:
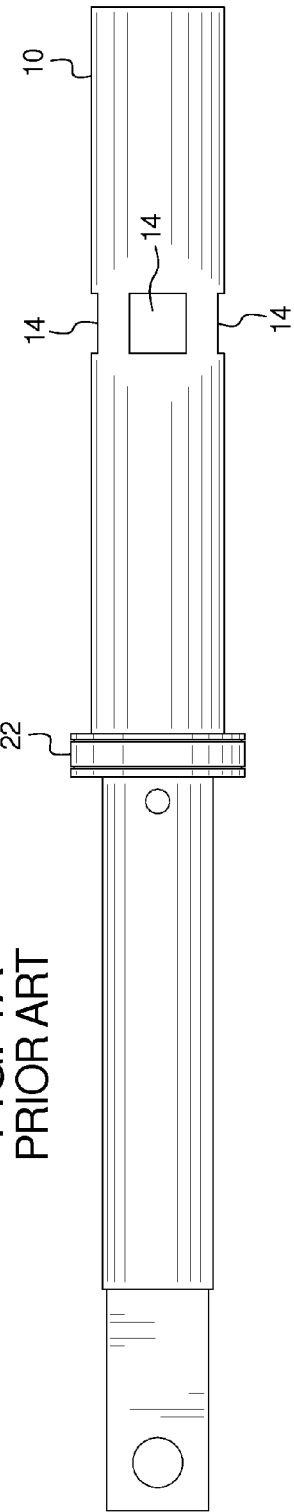
FIG. 1A shows a side view of a prior art valve shaft.

High pressure compressed air is a significant expense in a blow molding facility. Though the air itself has no associated cost, in order to reach elevated pressures, the air must be compressed. Compression is typically accomplished through an electrically-powered air compressor. Large scale compressors are expensive to purchase, have high maintenance costs, and require a large amount of electricity. Even when compressors are run only at off-times to minimize electricity costs, the compressed air must be stored. The storage systems are not only expensive to purchase, but also have high maintenance costs.

The expenses associated with high pressure compressed air are exacerbated by inefficiencies in blow molding facilities. Air leakage is a substantial source of waste. Leakages in the blowing valves can cause inconsistent blowing pressures, resulting in defective products. To compensate, many facilities increase the pressure of the air which increases the production costs.

In addition to defective products, inconsistent blowing pressures make light weighting more difficult. The goal of light weighting is to reduce the amount of material needed to make a product while still meeting the minimum technical requirements of the product. For example, light weighting for a plastic carbonated beverage container would involve reducing the amount of plastic or resin required to make the container by making the sidewalls of the container very thin, while maintaining enough strength in the sidewalls to contain the internal pressure of the carbonated beverage. Because light weighting requires less in the way of base materials, it is another way to reduce productions costs for blow molded products.

Applicants have found that one major source of high pressure compressed air leakage is utilization of certain valves found in the prior art. The internal components of this prior art valve may, for example, include a shaft 10, shown in FIG. 1A, and a sleeve 12, shown in FIG. 1B. Shaft 10 is substantially cylindrical with four substantially square shaft ports 14 and a sleeve guide 22. Sleeve 12 is substantially cylindrical, unitary, and configured to fit concentrically over shaft 10, as shown in FIG. 1C. Sleeve 12 has two open ends 26, 28. Sleeve 12 includes three sets of sleeve ports 16, 18, 20, each including four substantially square ports. Each set of sleeve ports 16, 18, 20 is distributed approximately evenly about a circumference of sleeve 12. Sleeve 12 also includes o-ring seats 24, configured to seat an o-ring to create a seal against the outer valve shell (not shown).

When in use, sleeve 12 slides transversely along shaft 10 to align one set of sleeve ports 16, 18, or 20, with shaft ports 14. Each set of sleeve ports 16, 18, 20 lines up with shaft ports 14 to perform a different function in the blow molding process, such as pre-blow, high blow, and exhaust. For example, sleeve ports 20 align with shaft ports 14 perform the pre-blow, then sleeve 12 slides along shaft 10 to align sleeve ports 18 with shaft ports 14 to perform the high-blow, then sleeve 12 slides along shaft 10 to align sleeve ports 16 with shaft ports 14 to exhaust the valve. The pre-blow step deforms the material to create a basic starting shape that is open at one end (which is attached to the valve). The high blow step pushes the basic starting shape out against the mold to deform the basic shape into the desired shape. The exhaust step removes the pressurized air from the blow molded product. The four ports in the sets of sleeve ports 16, 18, 20 must align with the four shaft ports 14 both horizontally and vertically in order for maximum air flow and pressure. Because sleeve 12 can spin about shaft 10, such strict alignment requires an alignment hole and pin (not pictured) to create and maintain alignment. If the pin deforms or breaks, however, the system is at risk for becoming misaligned, causing variable pressurized air delivery, and potentially a loss of compressed air.

Indeed, Applicants have found that the prior art unitary sleeve design, which has a metal to metal sealing surface between sleeve 12 and shaft 10, leaks high pressure compressed air. The air leaks out of the open ends and the sleeve ports that are not in use. For example, in a high blow stage using sleeve ports 18 aligned with shaft ports 14, high pressure compressed air leaks out of sleeve ports 16 and 20, as well as out of ends 26 and 28. Applicants have found that this prior art design is leaky even when used brand new. As discussed above, air leakage is wasteful and expensive. Additionally, sleeve 12 must be indexed carefully with shaft 10 in order to exactly align each of the four ports in the sets of sleeve ports 16, 18, 20 with the four shaft ports 14 to receive the expected amount and pressure of compressed air for accurate blow molding.

One existing solution to leaky original valves includes purchasing and installing an expensive electronically controlled valving system and a processor to replace the mechanical valve. Another existing solution is to purchase and install an elaborate cam system to pneumatically operate pilot valves, which in turn pneumatically operate the blowing valves. Not only are such systems expensive to purchase and maintain, they also have several additional moving parts which may break, malfunction, or cause unacceptable blow molded product variability. Further, such systems require significant modification to existing machinery designed around a mechanical valve with a specific internal configuration. Existing machinery typically includes a cam system to move the sleeve along the shaft to align the various ports to perform the blow molding steps. To replace the mechanical valve with an electrically controlled valve or pneumatically operated valves would require removal or replacement of the existing cam system.

Applicants have surprisingly found, however, that a segmented sleeve body with internal seals eliminates the leakage issues without requiring significant changes to the original blow molding machinery and components. The seals block the flow of high pressure compressed air out the ends of the sleeve and the ports that are not in use. The segmented body reduces waste by allowing the seals to be repaired or replaced when they wear out, as opposed to discarding the worn sleeve and purchasing or manufacturing a new sleeve. Additionally, a plurality of ports included in both the shaft and the sleeve eliminate the need for indexing, which allows the sleeve and shaft to rotate concentrically without affecting the delivered volume and pressure of high pressure compressed air to the blow molded product. The plurality of shaft and sleeve ports ensure consistent delivery of air, resulting in less variance in the resulting blow molded products, and therefore less waste. Such consistency also results in an increased ability to light weight blow molded products.

Furthermore, reducing the leakage of high pressure condensed air manufactured using electrically powered compressors has the environmentally friendly benefits of reducing the volume of compressed air necessary to perform blow molding, and, because the pressure is more consistent without leaks, also eliminating the increased pressures necessary to compensate for the former inconsistency. Reducing the volume and pressure of compressed air not only lowers productions costs, but also decreases the carbon footprint of blow molding by reducing the electrical draw on the power grid. Also, should the valve malfunction, the segmented design of the present disclosure enables the system to be repaired, rather than discarded and replaced.

With reference to FIGS. 2A and 2B, a shaft 110 and a sleeve 112 are provided in accordance with an embodiment of the present disclosure. Shaft 110 includes a guide 122, and a plurality of shaft ports 114. In this example embodiment, shaft 110 is substantially cylindrical, with substantially circular ports 114. Ports 114 are distributed substantially evenly about a circumference of shaft 110. Ports 114 are located on a shaft port plane which is substantially perpendicular to a central axis of the shaft, as shown in FIG. 2A.

Figure 2C:
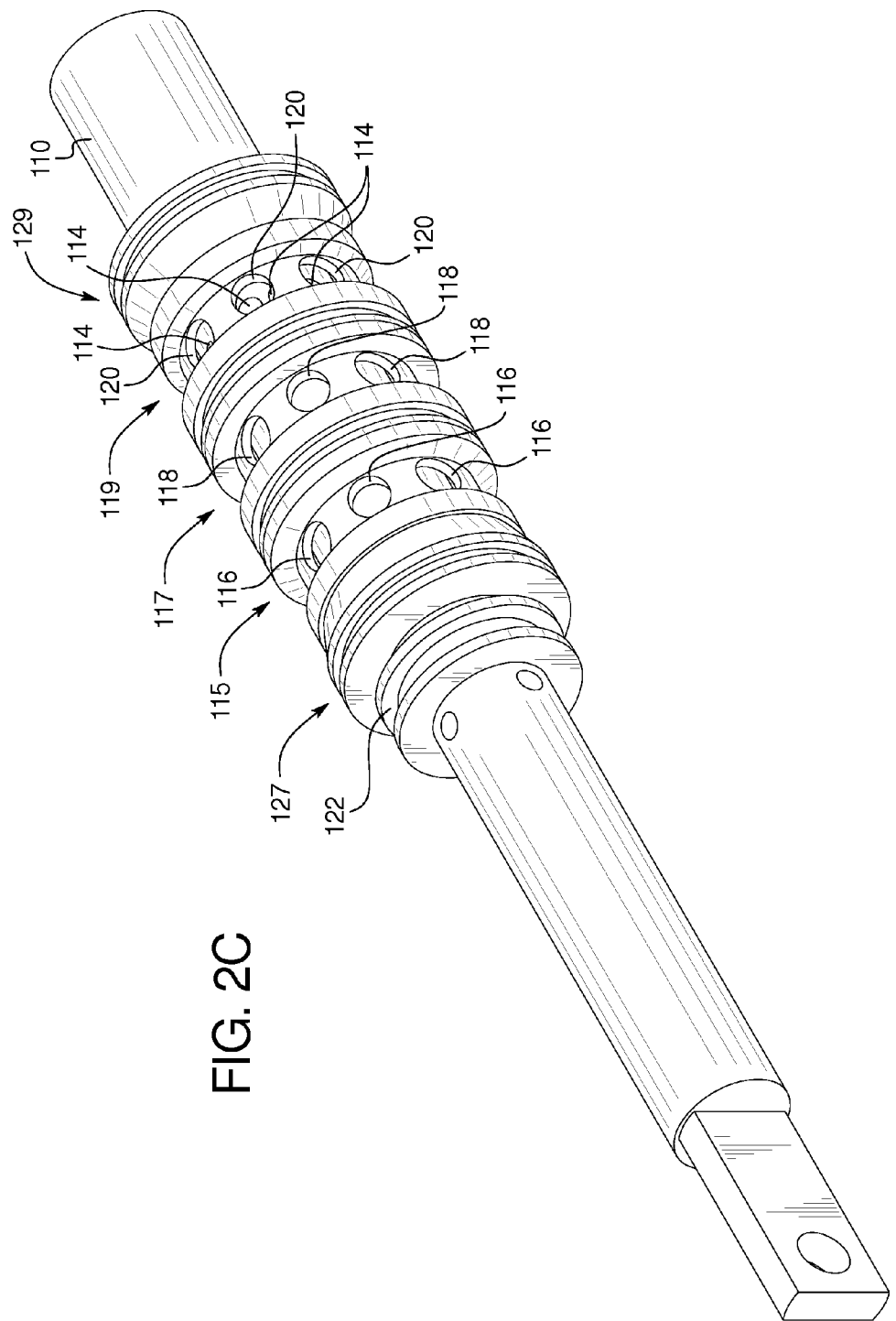
FIG. 2C shows a perspective view of an assembled valve in accordance with an embodiment of the present disclosure.

It should be appreciated that the shape of shaft 110 and ports 114 may by any suitable shape, such as substantially square, rectangular, triangular, trapezoidal, hexagonal, octagonal, or otherwise. It should also be appreciated that any suitable number of sleeve ports 114 may be used. For example, the number of ports may range from a single port to twenty or more ports depending on the size and shape of the ports. It should further be appreciated that shaft ports 114 may be any suitable size. In an embodiment, shaft ports 114 are smaller than sleeve ports 116, 118, or 120, as shown in FIG. 2C. Similarly, it should be appreciated that each individual shaft port 114 along a same circumferential path of the shaft may be any suitable distance from the next individual shaft port 114 along the same circumferential path. In an embodiment, shaft ports 114 are spaced more closely (i.e. there is a smaller distance between them) as compared to sleeve ports 116, 118, or 120, as shown in FIGS. 2A, 2B, and 2C.

Sleeve 112 of FIG. 2B is configured to fit concentrically about shaft 110 as shown in FIG. 2C, and to slide transversely along shaft 110. As illustrated, sleeve 112 includes five segmented body pieces. The body pieces include end portions 127, 129 with open ends 126, 128, locking piece 115 with a set of sleeve ports 116, sealing piece 117 with a set of sleeve ports 118, and sealing piece 119 with a set of sleeve ports 120. In this embodiment, each set of sleeve ports 116, 118, 120 has six substantially circular ports distributed substantially evenly about a circumference of sleeve 112, and each set of sleeve ports is located on an associated shaft port plane which is substantially perpendicular to a central axis of the shaft, as shown in FIG. 2B.

It should be appreciated, as discussed above, that any suitable shape, configuration, or number of sleeve ports may be used. It should also be appreciated that sleeve ports 116, 118, 120 may be any suitable size. In an embodiment, sleeve ports 116, 118, 120 are smaller than shaft ports 114, as shown in FIG. 2C. Similarly, it should be appreciated that each individual sleeve port 116, 118 or 120 along a same circumferential path (116 series, 118 series, or 120 series) of the shaft may be any suitable distance from the next individual shaft port 116, 118 or 120 along the same circumferential path. In an embodiment, shafts ports 120 are spaced further apart (i.e. there is a greater distance between them) as compared to shaft ports 114, as shown in FIGS. 2A, 2B, and 2C.

The size of the ports and distances between the ports may be configured to provide an efficient use of air. For example, in an embodiment where sleeve ports 116, 118, 120 are larger in size than shaft ports 114, as in FIG. 2C, each sleeve port 120 of the set of sleeve ports aligned with shaft ports 114 encompasses at least a portion of at least two shaft ports. In this way, individual sleeve port 120 may encompass at least one whole shaft port 114, as well as a portion of at least one other shaft port 114. Alternatively, individual sleeve port 120 may encompass a portion of one shaft port 114 and a portion of at least one other shaft port 114. Because the shaft ports (and/or portions of the shaft ports) are encompassed by the sleeve ports, the compressed air is able to easily flow out of the sleeve ports, thus allowing for an efficient use of air without waste.

Similarly, the distances between the individual sleeve ports on a same circumferential path and the distances between individual sleeve ports may be configured to allow for efficient air flow. For example, shaft ports 114 may be spaced more closely (i.e., there is a smaller distance between them) as compared to sleeve ports 116, 118, or 120, as shown in FIGS. 2A, 2B, and 2C. This allows the sleeve ports to encompass portions of more than one shaft port to allow the compressed air to easily flow out of the sleeve ports.

Locking piece 115 includes two ledges 152, 153, one on each end of the piece. Ledge 152 is received into receiving area 151 of end piece 127. Ledge 153 is received into receiving area 154 of sealing piece 117. Sealing piece 117 has a ledge 155, which is received into receiving area 156 of sealing piece 119. Sealing piece 119 has a ledge 157, which is received into receiving area 158 of end piece 129. In this way, ledges 152, 153, 155, 157 and receiving areas 151, 154, 156, 158 work to hold the pieces 127, 115, 117, 119, 129 of the sleeve 112 together and concentric about the shaft 110.

Figure 3:
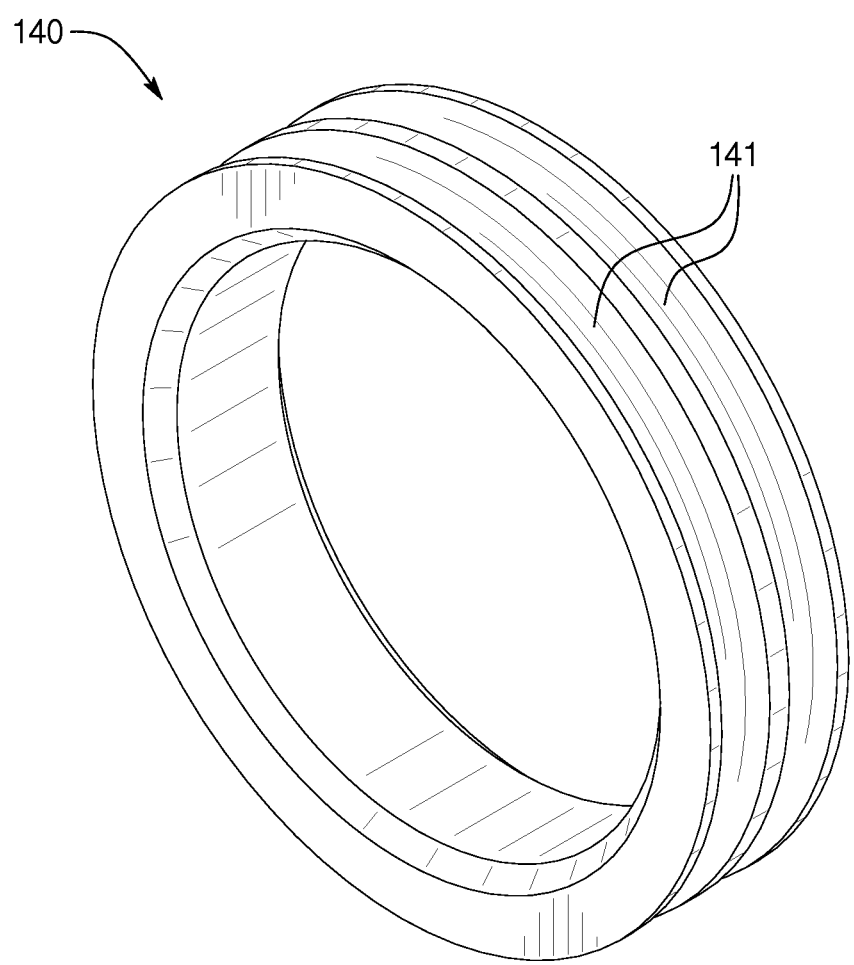
FIG. 3 shows a perspective view of a valve seal in accordance with an embodiment of the present disclosure.

End pieces 127, 129 and sealing pieces 117, 119 include o-ring seats 124, configured to seat an o-ring to create a seal against the outer valve shell (not shown). End pieces 127, 129 and sealing pieces 117, 119 each also include a seal seat 130, which is configured to house an internal seal 140 and two o-rings 142. Seal 140, as seen best in FIG. 3, is substantially cylindrical, and may include recessed portions 141 to cradle the o-rings 142. Seals 140 may also include chamfered edges as shown in FIG. 3. Seals 140 may be made of any suitable material, such as polymeric materials. Similarly, o-rings 124, 142 may be made of any suitable material, such as polymeric materials. It should be appreciated that the seal may be any suitable seal in any size, shape, material, or configuration.

Shaft 110 and sleeve body pieces 127, 115, 117, 119, 129 may be made of any suitable material, including any suitable metals with any suitable coatings. In one embodiment, the shaft and sleeve are made of aluminum with a teflon hardcoat. Shaft 110 and sleeve body pieces 127, 115, 117, 119, 129 may be manufactured in any suitable manner, such as machined or cast.

Figure 1B:
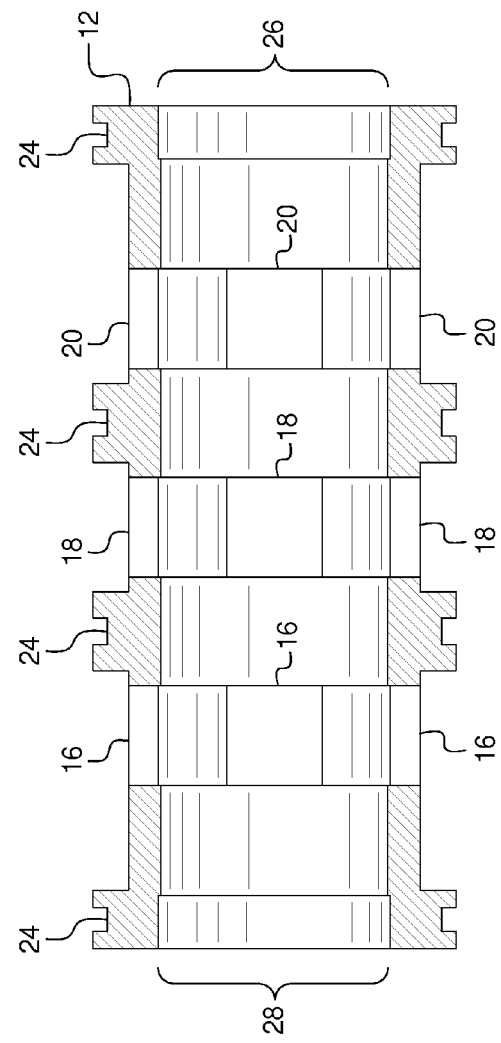
FIG. 1B shows a cross-section side view of a prior art valve sleeve.
Figure 1C:
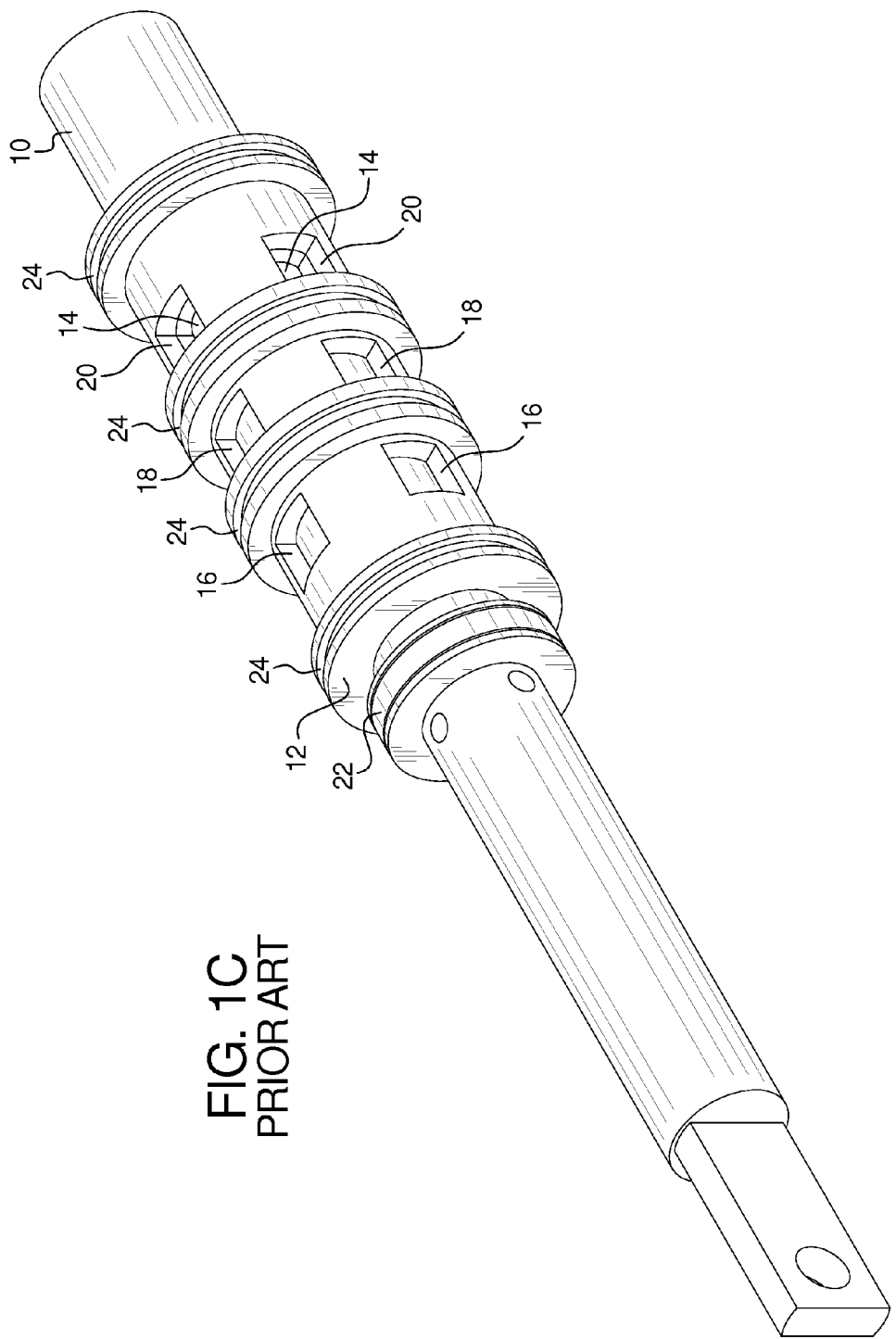
FIG. 1C shows a perspective view of an assembled prior art valve.

When in use, sleeve 112 slides transversely along shaft 110 similarly to the prior art system of FIGS. 1A to 1C. However, sets of sleeve ports 116, 118, 120 need not align as strictly as the prior art system of FIGS. 1A to 1C. Rather, in the system of FIGS. 2A to 2C, the plurality of ports 114 on shaft 110 combined with the plurality of ports of each set of ports 116, 118, 120 of sleeve 112 eliminates the need for strict indexing. Thus, sleeve 112 and shaft 110 may rotate concentrically without affecting the delivered amount and pressure of high pressure compressed air to the blow molded product. For example, for each sequential function in the blow molding process, each sequential set of sleeve port planes need only be aligned with the shaft port plane to cause sleeve ports 116, 118, 120 to be aligned transversely with the shaft ports 114 to perform the desired function. Additionally, the system optimizes the air flow by minimizing resistance to maximize volume and pressure. As discussed above, such a system provides a more consistent delivery of high pressure compressed air which reduces product variance and allows for increased light weighting.

It should be appreciated that the quantity of segmented body pieces is based at least in part on the quantity of functions the valve is desired to perform. For example, in a blow molding process where the same valve is employed to perform three steps (such as pre-blow, high blow, and exhaust), the number of segmented pieces may be one, two, three, four, five, or more, depending on how many seals are desired and if the sleeve is desired to be repairable. In embodiments such as those shown in FIGS. 2A to 2C and FIG. 4, the sleeve has five segmented pieces. One advantage of segmentation is that it makes the sleeve repairable. If a seal wears down or otherwise causes leaks in the system, the problematic seal is easily replaceable by segmenting the pieces, removing the seal, inserting a new seal, and reassembling the pieces using the ledges and receiving areas.

Figure 4:
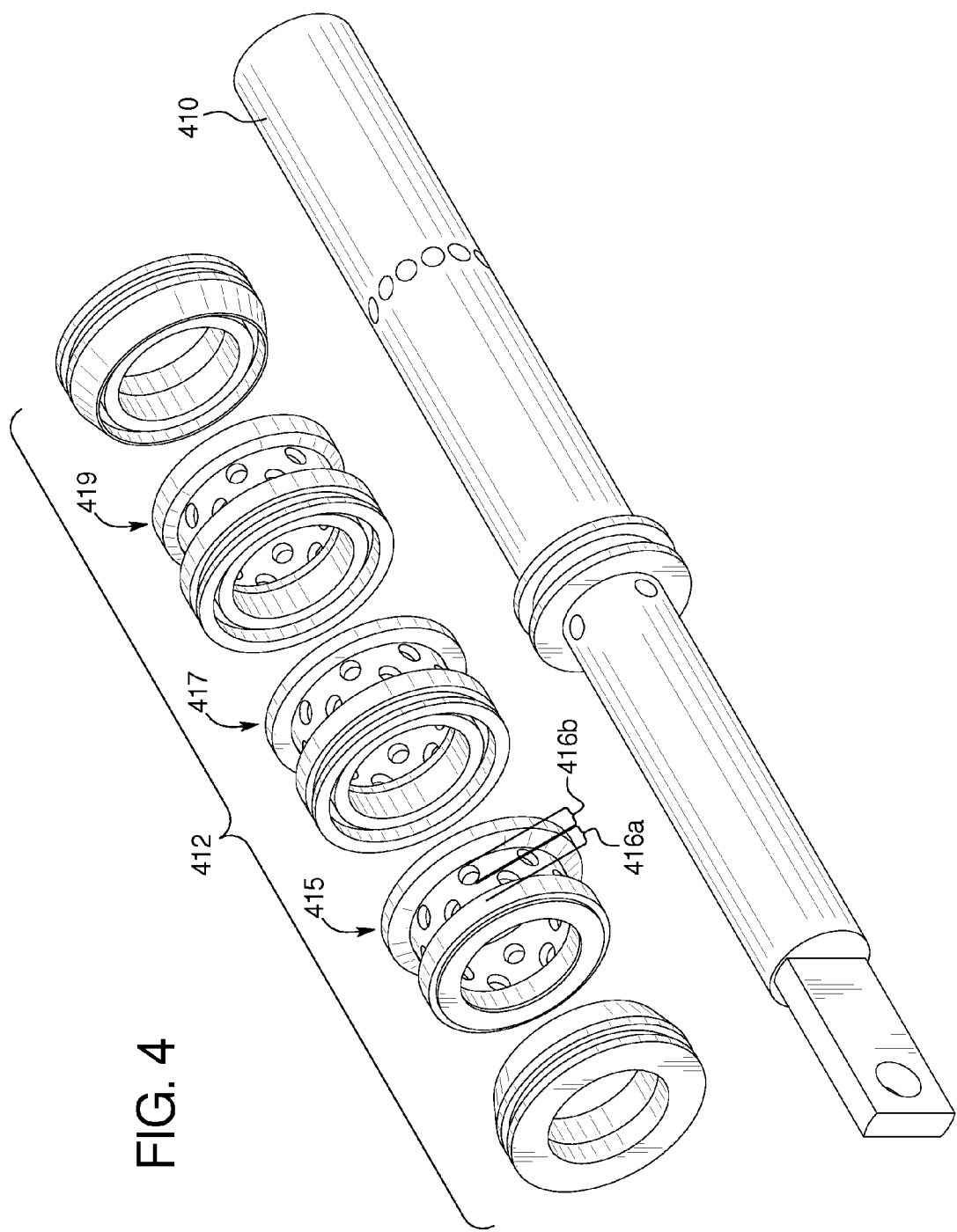
FIG. 4 shows a perspective view of an unassembled valve shaft and exploded valve sleeve in accordance with an embodiment of the present disclosure.

Another embodiment of the present disclosure is illustrated in FIG. 4. Sleeve 412 and shaft 410 are substantially similar to sleeve 112 and shaft 110 of FIGS. 2A to 2C. In the embodiment of FIG. 4, however, locking piece 415 and sealing pieces 417, 419 each include two sets of ports. For example, locking piece 415 includes sets of ports 416a and 416b. Each set 416a, 416b includes eight ports spaced approximately evenly about a circumference of the sleeve, and each set 416a, 416 is on a nearby, but different, sleeve port plane that is perpendicular to the central axis of shaft 410. Notably, the sets 416a and 416b are distributed about nearby, but different, circumferences of sleeve 412 in accordance with their adjacent planes. Additionally, the locations of ports 416b may be offset from the locations of ports 416a such that ports 416b are located approximately in the middle of the space between ports 416a, though on the nearby, but different, circumferential path or plane. Similar to the embodiment of FIG. 2A to 2C, it should be appreciated that any suitable size, shape, configuration, or number of sleeve ports may be used.

EXAMPLE

By way of example and not limitation, the following example is illustrative of an embodiment of the present disclosure.

A valve was made having components in accordance with FIG. 4. The valve performed as shown in FIG. 5 and described below. In month 1, only prior art valves in accordance with FIGS. 1A to 1C were in use in a stretch blow molding machine operating at pressures of about 40 bars, or 500 pounds per square inch for a particular blow molded plastic bottle product. In Month 1, 305 cubic feet per minute (CFM) of high pressure compressed air was used.

In Month 2, some prior art valves were replaced with valves in accordance with FIG. 4 as a limited test of their efficacy. CFM usage for Month 2 dropped to 291 CFM. In Month 3, all of the prior art valves in the blow molding machine were replaced with valves in accordance with FIG. 4, and the CFM usage dropped even lower, to 277 CFM. The valves of FIG. 4 were maintained in the blow molding machine for Month 4, and 281 CFM was used.

In Month 5, the valves of FIG. 4 were removed from the machine and replaced with the prior art valves of FIGS. 1A to 1C as a validation test. As expected, the CFM usage increased to 298 CFM. The valves of FIG. 4 were reinstalled in the blow molding machine in Month 6, and remained in use through Months 7 and 8. The CFM usage for Months 6, 7 and 8 was 276 CFM, 276 CFM, and 262 CFM, respectively.

As can be seen with reference to FIG. 5, the use of valves in accordance with the present disclosure accomplished an average CFM savings per month of 27.1 CFM (excluding month 2 because only a few prior art valves were replaced). Additionally, the valves were determined to be leak-free during an evaluation period of over six months. The leak-free determination was made by reference to compressed air use data in an infinity system.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A valve comprising:
   a shaft having a plurality of shaft ports distributed around a circumference of the shaft;
   a sleeve configured to fit concentrically around the shaft and comprising a body, the body comprises body pieces comprising a first end piece, a second end piece, a locking piece, and at least two sealing pieces, each of the first and second end pieces and the at least two sealing pieces housing an internal seal, the internal seal is cylindrical and comprises recessed portions that receive o-rings positioned between the internal seal and the body; and at least one set of a plurality of sleeve ports distributed around a circumference of the body, the plurality of sleeve ports constructed and arranged to cooperate with the plurality of shaft ports to facilitate fluid flow.

2. The valve of claim 1, wherein the plurality of shaft ports includes at least four shaft ports, and the plurality of sleeve ports includes at least four sleeve ports.

3. The valve of claim 1, wherein the sleeve and the shaft each are substantially cylindrical.

4. The valve of claim 1, wherein each of the locking piece and the at least two sealing pieces has at least one set of a plurality of sleeve ports distributed around a circumference of each of the locking piece and the at least two sealing pieces, and each set of the plurality of sleeve ports is distributed along a plane that is substantially perpendicular to a central axis of the shaft.

5. A valve comprising:
a shaft having a plurality of shaft ports distributed around a circumference of the shaft along a plane that is substantially perpendicular to a central axis of the shaft;
a sleeve configured to fit concentrically around the shaft, the sleeve comprising a body, the body comprises a first end piece, a second end piece, a locking piece, and at least two sealing pieces, each of the first and second end pieces and the at least two sealing pieces housing an internal seal, the internal seal is cylindrical and comprises recessed portions that receive o-rings positioned between the internal seal and the body; and
at least one set of a plurality of sleeve ports distributed around a circumference of the body, the plurality of sleeve ports is distributed on a sleeve port plane that is substantially perpendicular to a central axis of the sleeve, and the plurality of sleeve ports are configured to be larger in size than the plurality of shaft ports such that, when aligned, each sleeve port encompasses at least a portion of at least two shaft ports.

6. The valve of claim 5, wherein the plurality of shaft ports includes at least four shaft ports, and the at least one set of plurality of sleeve ports includes at least four sleeve ports.

7. The valve of claim 5, wherein the sleeve and the shaft are substantially cylindrical.

8. The valve of claim 1, wherein each of the body pieces has at least two sets of the plurality of sleeve ports distributed around a circumference of the body piece, each set of the plurality of sleeve ports is distributed on unique, adjacent planes that are substantially perpendicular to a central axis of the shaft.

9. The valve of claim 8, wherein each set of the plurality of sleeve ports on each of the body pieces are distributed approximately evenly about the body piece such that one set of the plurality of sleeve ports is offset from the other set on the same body piece.

10. The valve of claim 5, wherein a size of one of the plurality of sleeve ports is at least 1.5 times a size of one of the plurality of shaft ports.

11. A valve comprising:
a shaft having a plurality of shaft ports distributed around a circumference of the shaft along a shaft port plane that is substantially perpendicular to a central axis of the shaft;
a sleeve that is configured to fit concentrically around the shaft, the sleeve comprising a body, the body comprises a first end piece, a second end piece, a locking piece, and at least two sealing pieces, each of the first and second end pieces and the at least two sealing pieces housing an internal seal, the internal seal is cylindrical and comprises recessed portions that receive o-rings positioned between the internal seal and the body; and
at least one set of a plurality of sleeve ports distributed around a circumference of the body, the plurality of sleeve ports is distributed on a sleeve port plane that is substantially perpendicular to a central axis of the sleeve, and a distance between each of the plurality of sleeve ports is configured to be greater than a distance between each of the plurality of shaft ports such that, when the shaft port plane and the sleeve port plane are aligned, each sleeve port encompasses at least a portion of at least two shaft ports.

12. The valve of claim 11, wherein the plurality of shaft ports comprises at least eight shaft ports, and the plurality of sleeve ports comprises at least four sleeve ports.

13. The valve of claim 11, wherein the distance between each of the plurality of sleeve ports is about twice the distance between each of the plurality of shaft ports.

* * * * *